April 14, 1942.  L. E. COWEY  2,279,447
SHOCK ABSORBER STRUT OR OLEO LEG FOR AIRCRAFT
Filed April 6, 1940
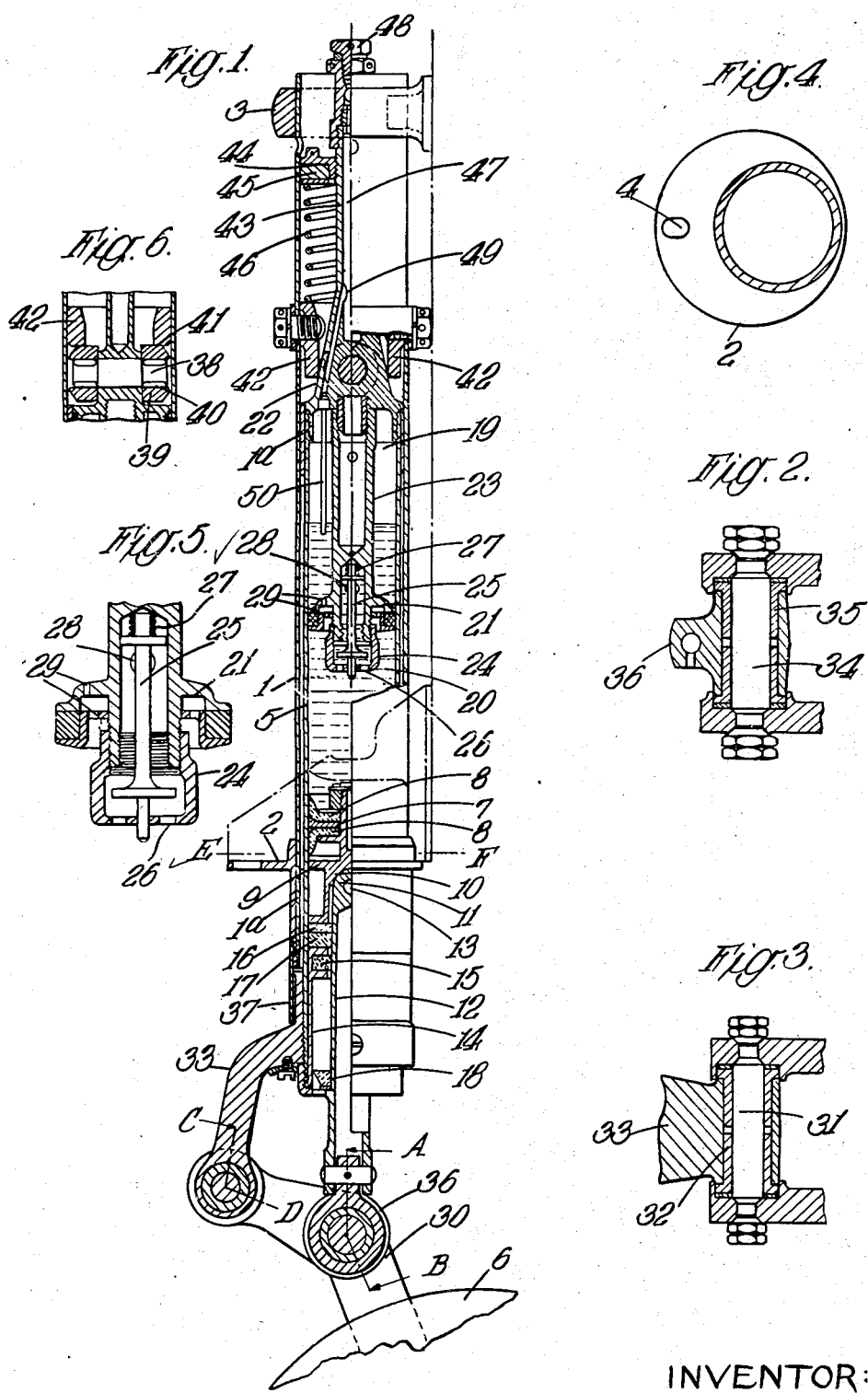
INVENTOR:
LEONARD EUGENE COWEY
BY Haseltine, Lake & Co.
ATTORNEYS Patented Apr. 14, 1942

2,279,447

UNITED STATES PATENT OFFICE 2,279,447

SHOCK ABSORBER STRUT OR OLEO LEG FOR AIRCRAFT

Leonard Eugene Cowey, Kew Gardens, England

Application April 6, 1940, Serial No. 328,230
In Great Britain September 22, 1939

8 Claims. (Cl. 244—104)

This invention relates to shock absorber struts, or oleo legs as used in connection with aircraft landing gear generally and of the pneumatic, oleo, or oleo pneumatic type including a cylinder containing a piston slidably mounted therein and is particularly concerned with tail wheel or nose wheel landing gear units of the oleo pneumatic type in which the wheel has a castoring action.

The chief object of the invention is to evolve a construction of shock absorber strut, or oleo leg, which will more effectively resist the stresses imposed by heavy landings than is at present the case with shock absorber struts, or oleo legs, at present in use, and in the case of tail wheels, or nose wheels, better self-centering properties.

A shock absorber strut, or oleo leg, for aircraft according to the invention comprises a compression cylinder for the pressure fluid, a piston slidably mounted therein, a lever in the form of a wheel fork or its equivalent pivotally connected to said cylinder, or a part associated therewith and in pivotal conection with said piston at a point intermediate the fulcrum of the wheel fork and the wheel centre.

In the case of a castoring tail wheel or nose wheel, it is preferred to locate the compression cylinder within a surrounding tubular sleeve, which is rigidly attached to the airframe of the aircraft, the compression cylinder being arranged to rotate, or partly rotate, within its associated sleeve.

In the case of the application of the invention to the main landing legs, when no castoring or self-centering is usually required, the compression cylinder itself may be rigidly attached to the airframe.

Referring to the drawing:

Figure 1 is a side elevation, partly in section, of a tail wheel landing unit constructed in accordance with the invention.

Figures 2, 3 and 4 are horizontal sections on the lines A—B, C—D, and E—F respectively in Figure 1.

Figure 5 is a sectional view illustrating the valve and its associated parts drawn to an enlarged scale.

Figure 6 is a fragmentary section taken at right angles to the section shown in Figure 1, illustrating details of the self-centering mechanism.

In the construction illustrated, the invention is shown applied to a castoring tail wheel, auxiliary tail wheel or nose wheel, the unit comprising an outer tubular casing or sleeve 1, which may be disposed substantially vertically or at any suitable angle and is intended for attachment to the airframe of an aircraft by means of an attachment plate 2 (see Figures 1 and 4), and a member 3 which encircles the casing at its upper end. The attachment plate 2 is formed with an elongated hole 4, for the reception of a securing bolt or similar fastening device.

The outer casing 1 contains an inner tubular member 5 which has a limited amount of endwise movement within the outer casing for a purpose hereinafter described and is rotatably mounted therein on upper and lower bearings 1a of the oil retaining type, the inner tubular member constituting the compresison cylinder or reservoir for the pressure or shock absorbing medium, the shock absorbing medium in the construction illustrated consisting of oil and air under pressure.

The load to which the wheel 6 is subjected is transferred to the oil and air through the medium of a piston 7 located within the cylinder 5, the piston comprising a central portion fitting closely within the cylinder and carrying at its upper and lower ends cup packings 8 extending upwardly and downwardly. The piston 7 extends downwardly and is formed with a flange 9 lying beneath the lower cup packing 8, the downwardly depending part of the piston being of hollow construction and being formed with a part circular or part spherical seating 10, adapted to receive the correspondingly shaped end 11 of a hollow piston rod 12, the piston rod 12 and the piston being connected together by means of a transverse pin 13. In order to prevent the ingress of grit and moisture to the cylinder 5, the cylinder at its lower end is fitted with an internally arranged closure member 14 carrying a felt washer 15 fitting closely around the piston rod 12, whilst leather washers 16 and 17 are located beneath the lower end of the piston and fit closely around the tubular piston rod, and lie in close engagement with the inner surface of the cylinder. A further leather washer 18 is provided disposed between the tubular piston rod and the inner surface of the member 14. In this way, any possibility of grit or moisture finding its way into the lower end of the cylinder and eventually getting past the piston is effectively prevented, whilst the felt and leather washers permit of a certain amount of rocking movement of the tubular piston rod incidental to upward and downward movement of the wheel 6.

The cylinder 5 at a point intermediate its length is divided into two compartments, namely, an upper compartment 19 and a lower compartment 20, by means of a piston-like member 21, forming an integral downwardly depending part of a closure member 22, closing the cylinder at its upper end. The part 23 is of tubular form and at its lower end carries a cap 24 in which is located a valve 25, the cap being formed with oil transfer holes 26 which are adapted to be opened or closed according to the position of the valve 25 relative thereto, the valve stem at its upper end carrying a surrounding coil spring 27, which serves to force the valve downwardly into a position in which it closes the holes 26. The member 23 is formed with one or more diametrically arranged holes 28 through which oil can pass from the cylinder into and out of the space containing the valve.

Normally, the valve 25 is maintained in a closed position, that is to say, a position in which the holes 26 are closed by its associated spring, but upon the piston 7 moving rapidly in an upward direction in the cylinder 5 the valve 25 is forced upwardly off its seating (as shown in Figures 1 and 5) thus permitting of the relatively free flow of oil through the holes 26 and 28 from the lower compartment 20 to the upper compartment 19. During rebound and movement of the tail wheel in a downward direction and consequential downward movement of the piston 7 in the cylinder 5 the valve 25 will be moved on to its seating in which position it covers the holes 26, a proportion of the oil contained in the upper compartment 19 returning relatively slowly to the compartment 20 by way of small diameter holes 29 formed in the piston-like part 21, the holes being of much smaller diameter than the holes 26 thereby restricting the flow of oil to a material extent. In this way, the air contained in the compartment 19 is compressed during upward movement of the piston and consequently acts as a shock absorbing medium, movement of the piston in a downward direction during rebound being controlled by the restricted flow of oil from the upper compartment to the lower compartment.

The wheel 6 is mounted in a wheel-fork 30, which is conveniently formed in two halves, the component parts of which are clamped to opposite ends of a pivot pin 31, located in bearings 32, in a bracket 33 attached to the lower end of the cylinder 5, the pivot pin 31 being offset relatively to the axis of the cylinder and extending forwardly and downwardly therefrom. The component parts of the wheel-fork 30 are also intermediate their length clamped to the opposite ends of a further pivot pin 34, located in bearings 35, in a part 36 attached to the lower end of the hollow piston rod 12, the arrangement being such that the wheel and its associated fork are free to pivot about the pivot pin 31 in an upward and downward direction. The bracket 33 is surrounded at its upper end by a sleeve-like member 37 which is attached to the lower end of a downwardly depending extension on the member 2, the member 37 serving as a shield to prevent the ingress of dust or grit during taxi-ing of the aircraft.

The closure member 22 closing the cylinder at its upper end, carries a diametrically arranged pin 38, the extremities of which carry rollers 39 revolubly mounted on needle type roller bearings 40, the rollers co-operating with cam surfaces 41 formed on a member 42, located within the casing 1, the cam surfaces being of arcuate, substantially arcuate, or other suitable shape.

The closure member 22 has an upward extension 43 and near its upper end carries a circular housing 44 for a felt washer 45 in rubbing contact with the inner surface of the casing 1, a coil spring 46 being interposed between the member 44 and the member 42 to take the weight of the cylinder, piston and remaining parts of the wheel unit which are free to move in an upward and downward direction and thus maintain the rollers in engagement with the arcuate cam surfaces when the aircraft is in the air.

The part 43 has an axially arranged boring 47, closed at its upper end by means of a valve closure member 48, which is used for introducing the requisite quantity of oil and air, the axial boring 47 leading to a further boring 49 which in turn leads into the interior of the cylinder by way of a dip tube 50 disposed just below the surface of the oil, the dip tube acting as an oil seal and also as a guide to the oil level in the cylinder.

The rollers 39 remain normally in contact with the narrow parts of the arcuate cam surfaces, as indicated in Figs. 1 and 6, and, if displaced, will always tend to return to that position. The cylinder is capable of moving downwardly sufficiently to permit the rollers to move clear of the cam surfaces and at the same time turn throughout a complete circle about its axis. Due to the arcuate shape of the cam surfaces and the downward thrust exerted by the weight of the aircraft tail, the rollers will always tend to return to their normal position if the wheel is deflected laterally during taxi-ing, the came surfaces being so shaped that the self-centering action will be sufficient to permit of the aircraft being taxied on the ground in a straight line across wind, but not to interfere with the necessary castoring movement of the wheel either when man-handling the aircraft on the ground or in the hanger, or by operation of the rudder control surfaces for steering purposes when taxi-ing, or action of different brakes.

If desired, the cylinder, wheel-fork, or associated rotatable parts may be connected to the rudder bar or other rudder control member for steering purposes when taxi-ing.

It is preferred, however, to connect the rudder or rudder operating member or members with the cam 42 whereby the said rudder, or rudder operating member or members will not be subjected to any direct shock resulting from the tail wheel being deflected laterally as a result of striking an obstruction whilst at the same time permitting of complete rotation of the wheel fork and its associated wheel about the axis of the compression cylinder. With such an arrangement it is preferred to arrange a thrust race above the upper surface of the cam 42, the thrust race being carried by an abutment on the inner surface of the outer casing, the cam being so arranged that it has a limited rotational movement. By pivotally connecting the wheel-fork to the lower end of the compression cylinder or a part associated therewith such as the bracket 33, and connecting the wheel-fork to the piston by means of a connecting rod in pivotal connection with the wheel-fork and piston, the piston and its associated cylinder are relieved of lateral stresses to which they would otherwise be subjected were the piston rigidly associated with the wheel as is the usual practice.

What I claim and desire to secure by Letters Patent of the United States is:

1. A shock absorber strut for aircraft tail wheel or nose wheel landing gear units, comprising a compression cylinder for containing the shock absorbing fluid, a piston slidably mounted therein, a coupling member attached to said piston and adapted for connection with a wheel fork or other wheel carrying member, a piston like member located within said cylinder and serving to divide said cylinder into upper and lower compartments, said piston like member having an oil passage for the transfer of fluid from one compartment to the other, a tubular sleeve surrounding said cylinder in which sleeve said cylinder can rotate about its axis and have a limited endwise sliding movement within said sleeve, a bracket on said cylinder for carrying the wheel fork or other wheel carrying member, and a self centering cam and co-operating rollers carried by said sleeve and said cylinder, said cam and rollers being maintained in operative engagement when the wheel is in contact with the ground by the upward thrust exerted by the wheel under the weight of the aircraft to produce a self centering action but permit of a castoring movement.

2. A shock absorber strut for aircraft tail wheel or nose wheel landing gear units, comprising a compression cylinder for containing the shock absorbing fluid, a piston slidably mounted therein, a coupling member attached to said piston and adapted for connection with a wheel fork or other wheel carrying member, a piston like member located within said cylinder and serving to divide said cylinder into upper and lower compartments, said piston like member having an oil passage for the transfer of fluid from one compartment to the other, a tubular sleeve surrounding said cylinder in which sleeve said cylinder can rotate about its axis and have a limited endwise sliding movement within said sleeve, a bracket on said cylinder for carrying the wheel fork or other wheel carrying member, a self centering cam and cooperating rollers carried by said sleeve and said cylinder, said cam and rollers being maintained in operative engagement when the wheel is in contact with the ground by the upward thrust exerted by the wheel under the weight of the aircraft to produce a self centering action but permit of a castoring movement and a spring acting upon the cam and rollers to maintain them in engagement when the aircraft is in the air.

3. A shock absorber strut for aircraft tail wheel or nose wheel landing gear units, comprising a compression cylinder for containing the shock absorbing fluid, a piston slidably mounted therein, a coupling member attached to said piston and adapted for connection with a wheel fork or other wheel carrying member, a piston like member located within said cylinder and serving to divide said cylinder into upper and lower compartments, said piston like member having an oil passage for the transfer of fluid from one compartment to the other, a valve slidable axially within said piston like member for closing the oil transfer passage during downward movement of the sliding piston, a tubular sleeve surrounding said cylinder in which sleeve said cylinder can rotate about its axis and have a limited endwise sliding movement within said sleeve, a bracket on said cylinder for carrying the wheel fork or other wheel carrying member, a self centering cam and co-operating rollers carried by said sleeve and said cylinder, said cam and rollers being maintained in operative engagement when the wheel is in contact with the ground by the upward thrust exerted by the wheel under the weight of the aircraft to produce a self centering action but permit of a castoring movement, and a spring acting upon the cam and rollers to maintain them in engagement when the aircraft is in the air.

4. A shock absorber strut for aircraft tail wheel or nose wheel landing gear units, comprising a compression cylinder for containing the shock absorbing fluid, a piston slidably mounted therein, a coupling member attached to said piston and adapted for connection with a wheel fork or other wheel carrying member, a piston like member located within said cylinder and serving to divide said cylinder into upper and lower compartments, said piston like member having an oil passage for the transfer of fluid from one compartment to the other, a valve slidable axially within said piston like member for closing the oil transfer passage during downward movement of the sliding piston, a spring for holding said valve in its closed position, a tubular sleeve surrounding said cylinder in which sleeve said cylinder can rotate about its axis and have a limited endwise sliding movement within said sleeve, a bracket on said cylinder for carrying the wheel fork or other wheel carrying member, a self centering cam and co-operating rollers carried by said sleeve and said cylinder, said cam and rollers being maintained in operative engagement when the wheel is in contact with the ground by the upward thrust exerted by the wheel under the weight of the aircraft to produce a self centering action but permit of a castoring movement, and a spring acting upon the cam and rollers to maintain them in engagement when the aircraft is in the air.

5. A shock absorber strut for aircraft tail wheel or nose wheel landing gear units, comprising a compression cylinder for containing the shock absorbing fluid, a piston slidably mounted therein, a coupling member attached to said piston and adapted for connection with a wheel fork or other wheel carrying member, a piston like member located within said cylinder and serving to divide said cylinder into upper and lower compartments, said piston like member having an oil passage for the transfer of fluid from one compartment to the other, a valve slidable axially within said piston like member for closing the oil transfer passage during downward movement of the sliding piston, additional oil transfer passages through which oil can pass slowly from one compartment to the other when the valve is closed, a tubular sleeve surrounding said cylinder in which sleeve said cylinder can rotate about its axis and have a limited endwise sliding movement within said sleeve, a bracket on said cylinder for carrying the wheel fork or other wheel carrying member, a self centering cam and co-operating rollers carried by said sleeve and said cylinder, said cam and rollers being maintained in operative engagement when the wheel is in contact with the ground by the upward thrust exerted by the wheel under the weight of the aircraft to produce a self centering action but permit of a castoring movement, and a spring acting upon the cam and rollers to maintain them in engagement when the aircraft is in the air.

6. A shock absorber strut for aircraft tail wheel or nose wheel landing gear units, comprising a compression cylinder for containing the shock absorbing fluid, a piston slidably mounted therein, a coupling member attached to said piston and adapted for connection with a wheel fork or other wheel carrying member, a piston like member located within said cylinder and serving to divide said cylinder into upper and lower compartments, said piston like member being carried by a tubular support arranged axially of the cylinder and depending downwardly from an end cap closing said cylinder at its upper end, said piston like member having an oil passage for the transfer of fluid from one compartment to the other, a tubular sleeve, surrounding said cylinder in which sleeve said cylinder can rotate about its axis and have a limited endwise sliding movement within said sleeve, a bracket on said cylinder for carrying the wheel fork or other wheel carrying member and a self centering cam and co-operating rollers carried by said sleeve and said cylinder, said cam and rollers being maintained in operative engagement when the wheel is in contact with the ground by the upward thrust exerted by the wheel under the weight of the aircraft to produce a self centering action but permit of a castoring movement.

7. A shock absorber strut for aircraft tail wheel or nose wheel landing gear units, comprising a compression cylinder for containing the shock absorbing fluid, a piston slidably mounted therein, a coupling member attached to said piston and adapted for connection with a wheel fork or other wheel carrying member, a piston like member located within said cylinder and serving to divide said cylinder into upper and lower compartments, said piston like member having an oil passage for the transfer of fluid from one compartment to the other, a tubular sleeve surrounding said cylinder in which sleeve said cylinder can rotate about its axis and have a limited endwise sliding movement within said sleeve, a bracket on said cylinder for carrying the wheel fork or other wheel carrying member, a self centering cam and co-operating rollers carried by said sleeve and said cylinder, said cam and rollers being maintained in operative engagement when the wheel is in contact with the ground by the upward thrust exerted by the wheel under the weight of the aircraft to produce a self centering action but permit of a castoring movement, said coupling member attached to the sliding piston projecting downwardly from the lower end of the cylinder and a soft washer fitting closely within the lower end of said cylinder and fitting closely around said coupling member but permitting of the requisite lateral movement of the coupling member resulting from arcuate movement of the wheel and at the same time preventing the ingress of grit and moisture at the lower end of said cylinder.

8. A shock absorber strut for aircraft tail wheel or nose wheel landing gear units, comprising a compression cylinder for containing the shock absorbing fluid, a piston slidably mounted therein, a coupling member attached to said piston and adapted for connection with a wheel fork or other wheel carrying member, a piston like member located within said cylinder and serving to divide said cylinder into upper and lower compartments, said piston like member having an oil passage for the transfer of fluid from one compartment to the other, a tubular sleeve surrounding said cylinder in which sleeve said cylinder can rotate about its axis and have a limited endwise sliding movement within said sleeve, a bracket on said cylinder for carrying the wheel fork or other wheel carrying member, a self centering cam and co-operating rollers carried by said sleeve and said cylinder, said cam and rollers being maintined in operative engagement when the wheel is in contact with the ground by the upward thrust exerted by the wheel under the weight of the aircraft to produce a self centering action but permit of a castoring movement, said cylinder having an oil and air inlet opening at its upper end terminating in a dip tube so arranged that when the requisite quantity of oil is contained in said cylinder the outlet is beneath the surface of the oil thereby providing an oil seal.

LEONARD EUGENE COWEY.